United States Patent
Ding et al.

(10) Patent No.: US 12,492,524 B2
(45) Date of Patent: Dec. 9, 2025

(54) WATER RESOURCE CIRCULATION AND PURIFICATION DEVICE

(71) Applicant: China Institute of Water Resources and Hydropower Research, Beijing (CN)

(72) Inventors: Xiangyi Ding, Beijing (CN); Min Li, Beijing (CN); Meirong Jia, Beijing (CN); Yingying Zhang, Beijing (CN)

(73) Assignee: CHINA INSTITUTE OF WATER RESOURCES AND HYDROPOWER RESEARCH, Beijing (CN)

( * ) Notice: Subject to any disclaimer, the term of this patent is extended or adjusted under 35 U.S.C. 154(b) by 406 days.

(21) Appl. No.: 18/322,613

(22) Filed: May 24, 2023

(65) Prior Publication Data

US 2024/0392522 A1 Nov. 28, 2024

(51) Int. Cl.
*E02B 15/10* (2006.01)
(52) U.S. Cl.
CPC .................... *E02B 15/10* (2013.01)
(58) Field of Classification Search
CPC .............................. E02B 15/104; E02B 15/10
See application file for complete search history.

(56) References Cited

U.S. PATENT DOCUMENTS

2019/0009867 A1* 1/2019 Dieters ................. B63B 25/004

FOREIGN PATENT DOCUMENTS

| CN | 113735360 A | 12/2021 |
| CN | 114368879 A | 4/2022 |

* cited by examiner

*Primary Examiner* — Thuan D Dang
(74) *Attorney, Agent, or Firm* — Andrew C. Cheng

(57) ABSTRACT

A water resource circulation and purification device includes a floating member floating on water to receive salvaged floating objects, a first shaft rotatably connected to the floating member, a power mechanism configured to drive the first shaft to rotate, a plurality of fishing mechanisms configured to salvage the floating objects in the water along with rotation of the first shaft, a guiding member configured to guide a fishing claw of the fishing mechanism to rotate and move directly above the floating member, and a first mechanism configured to move the water relative to the floating member, to clean up different water areas; the floating objects within the fishing claw fallen onto the floating member with a gravity thereof, the fishing claw detached from the guiding member rotating under an action of an elastic element and leaving from directly above the floating member to reach an outer of the floating member.

8 Claims, 4 Drawing Sheets

WATER RESOURCE CIRCULATION AND PURIFICATION DEVICE

BACKGROUND

1. Technical Field

The present disclosure generally relates to the field of water source purification technologies, and especially relates to a water resource circulation and purification device.

2. Description of Related Art

Floating objects with a wide range of sources, often appear in rivers and lakes, such as plastic bottles, plastic belts, fallen leaves and branches, etc, which can harm a growth of aquatic animals in the water, and even some substances decay and deteriorate after being long-term immersion, causing pollution to the water and seriously affecting a quality of the water. Therefore, it is necessary to salvage the floating objects to purify the water source.

At present, there are several common methods for salvaging the floating objects: for flowing water, such as a river, an interception net can be set up at an embankment of the river, so that the water flow drives the floating objects to be intercepted during movement of the floating objects driven by the water flow, and after a certain period, the interception net can be dragged to the ground to remove the floating objects. For still water areas, such as a lake, net bags are placed on a boat and then the boat is driven to move on the lake to salvage the floating objects. In such above methods, the floating objects are first collected in the water, and then accumulated to a certain amount to be manually determined to be removed. In this way, the foreign objects can't be timely transferred to the outside of the water, and there is still a problem of polluting the water source because the floating objects are immersed in the water for a long time. Especially for the flowing water, the floating objects block the interception net, thereby causing a decrease in a flow rate of the flowing water, affecting a normal flow of water, and even causing the flowing water to be left front from the interception net. In addition, removing the floating objects from the interception net is basically done by manpower, which is labor-intensive.

SUMMARY

The technical problems to be solved: in view of the shortcomings of the related art, the present disclosure provides a water resource circulation and purification device which can automatically and timely transfer floating objects that have been salvaged to the outside of the water.

In order to implement the above technical purpose, a technical solution provided by the present disclosure is:

a water resource circulation and purification device according to an embodiment of the present disclosure includes:
a floating member arranged along an X-axis direction and floating on a water surface, and configured to receive floating objects that have been salvaged;
a first mechanism configured to cause the floating member to move relative to the water;
a first shaft arranged along a Y-axis direction and rotatably connected to the floating member;
a power mechanism configured to drive the first shaft to rotate; and
at least one fishing mechanism including:
a supporting rod radially arranged along the first shaft and one end of the supporting rod fixed with the first shaft; a projection of the supporting rod non-intersected with a projection of the floating member on an X-Y plane;
an articulated shaft arranged on the other end of the supporting rod, with an acute angle being formed between the articulated shaft and the first shaft;
a fishing claw including an uncovered cabin hinged with the supporting rod through the articulated shaft, and a clawing portion configured to collect the floating objects and filter water of the floating objects that have been collected;
a limiting member configured to limit a maximum angle between the supporting rod and the fishing claw;
an elastic element configured to move the fishing claw along a direction of expanding an angle between the fishing claw and the supporting rod; and wherein the fishing claw is in a reset state when the angle between the fishing claw and the supporting rod is the maximum angle; when the fishing claw is in the reset state, a projection of the fishing claw is un-intersected with the projection of the floating member on the X-Y plane; and
a guiding member fixed above the floating member and configured to guide the fishing claw that is arranged above a side of the floating member, to rotate around the articulated shaft to the right above of the floating member; and wherein when the fishing claw detaches from the guiding member, a horizontal height of the clawing portion is lower than a horizontal height of the cabin, so that the floating objects within the fishing claw fall onto the floating member with a help of gravity of the floating objects; and after the fishing claw detaches from the guiding member, the fishing claw returns to the reset state under an action of the elastic element.

Wherein the guiding member is a rod-shaped structure and includes a first portion and a second portion, a horizontal height of the first portion greater than a horizontal height of the second portion, the first portion passing through a space swept by the fishing claw that is in the reset state along with rotation of the first shaft, and the second portion arranged directly above of the floating member.

Wherein the power mechanism is a rotation device such as a motor.

Wherein the power mechanism includes a water blade configured to use water flow to drive an own rotation of the water blade, and a drive mechanism; the water blade connected to the first shaft through the drive mechanism, so as to drive the first shaft to rotate.

Wherein the drive mechanism includes a second shaft coaxially fixed with the water blade, and a third shaft rotatably connected to the floating member; the second shaft and the third shaft connected with each other by a chain and sprocket transmission way, and the third shaft and the first shaft connected with each other by a gear meshing way.

Wherein the maximum angle is 180°.

Wherein the first mechanism is a propulsion device, such as an oar, capable of driving the floating member to move in the water flow.

Wherein the first mechanism is a fixed device, such as Y-shaped ropes teel chains, and anchoring equipments etc., capable of positioning the floating member in a river.

The present disclosure provides the advantages as below:
the present disclosure provides a new structure which can automatically transfer the floating objects that have been salvaged, to the floating member, and timely separate the floating objects from the water.

DETAILED DESCRIPTION

Reference will now be made in detail to embodiments, examples of which are illustrated in the accompanying drawings. The same or similar labels throughout the description represent the same or similar components or components with the same or similar functions. The embodiments described below with reference to the accompanying drawings are exemplary and are only intended to explain the present disclosure, rather than being understood as limitations to the present disclosure.

Figure 1:
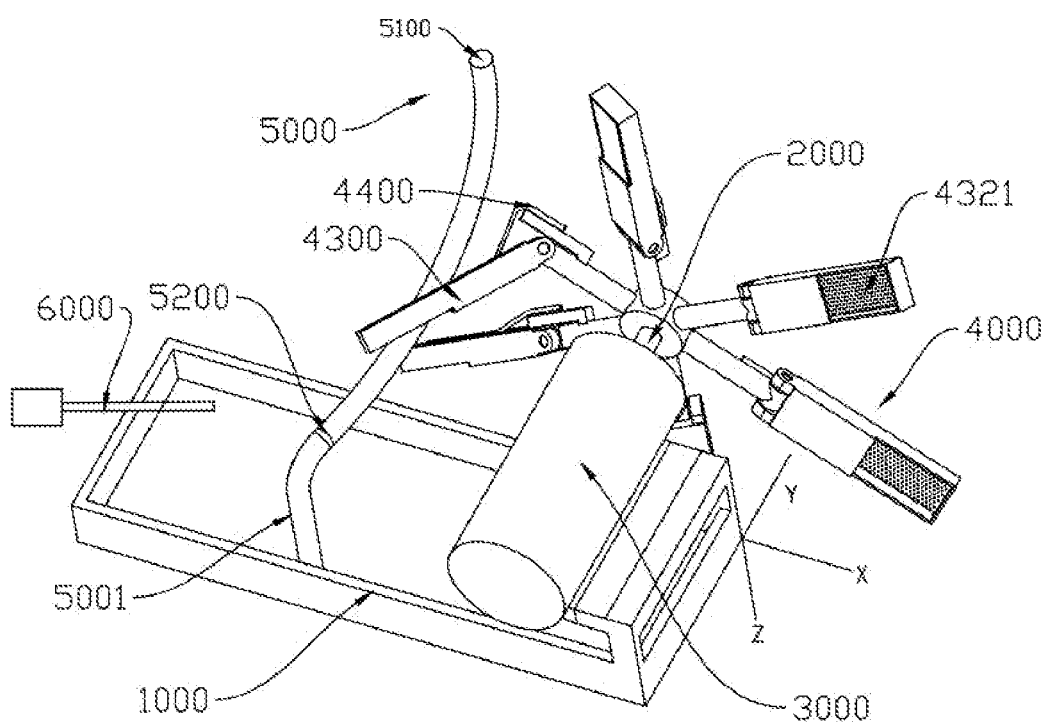
FIG. 1 is a schematic view of a water resource circulation and purification device in accordance with an embodiment of the present disclosure.
Figure 2:
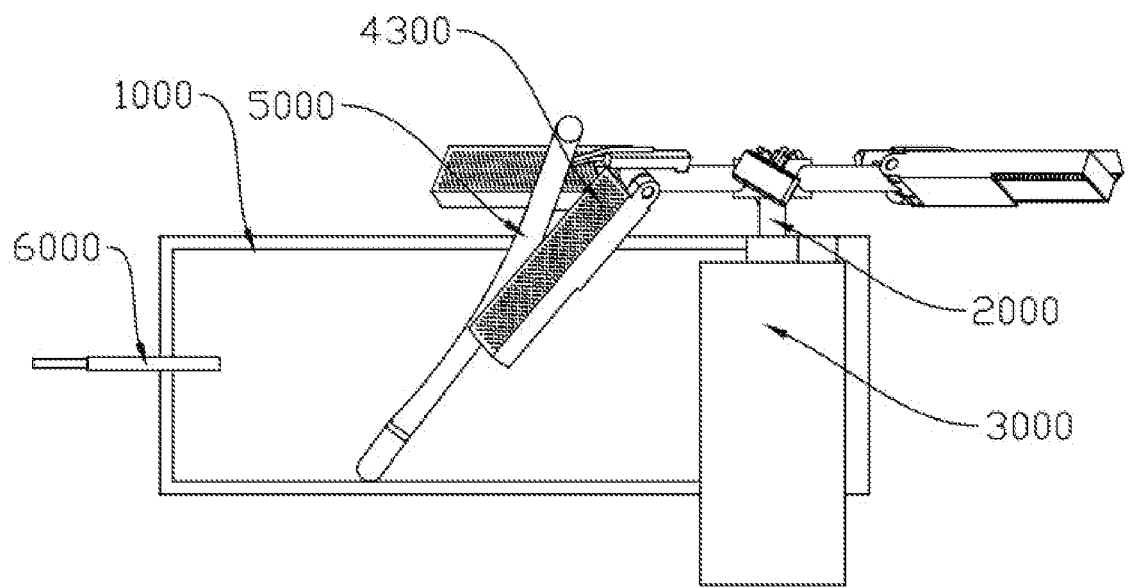
FIG. 2 is a top view of the water resource circulation and purification device of FIG. 1.
Figure 3:
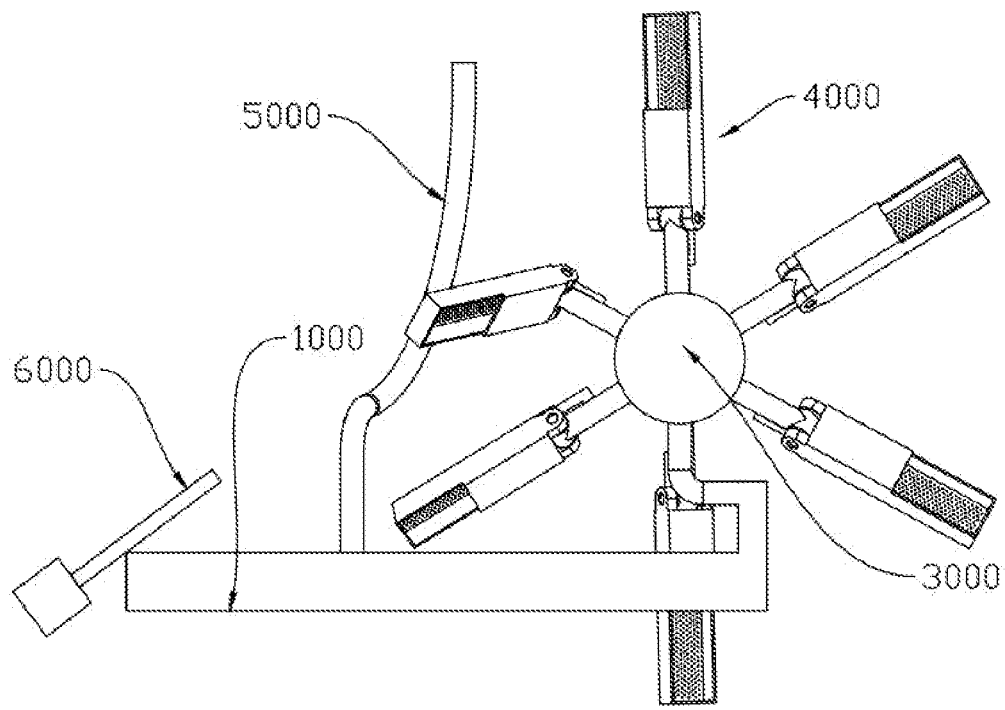
FIG. 3 is a front view of the water resource circulation and purification device of FIG. 1.
Figure 7:
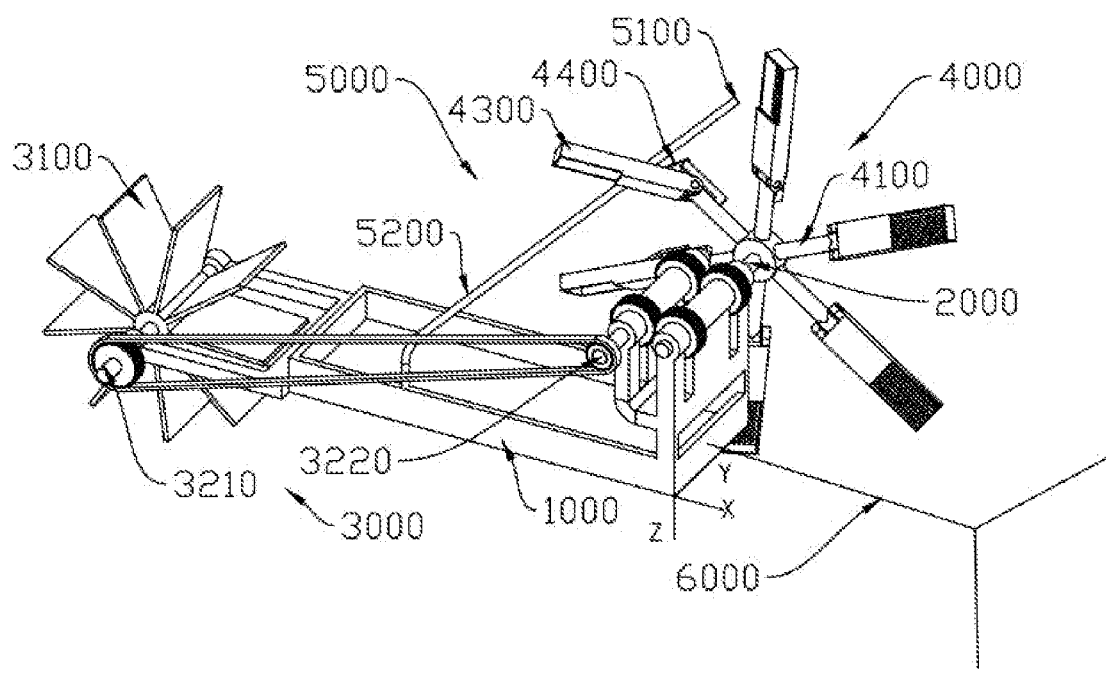
FIG. 7 is a schematic view of a water resource circulation and purification device in accordance with another embodiment of the present disclosure.

Referring to FIG. 1 and FIG. 7, FIG. 1 is a schematic view of a water resource circulation and purification device in accordance with an embodiment of the present disclosure, while FIG. 7 is a schematic view of a water resource circulation and purification device in accordance with another embodiment of the present disclosure. The water resource circulation and purification device includes a floating member 1000, a first shaft 2000, a power mechanism 3000, a plurality of fishing mechanisms 4000, a guiding member 5000 and a first mechanism 6000. The floating member 1000 is arranged along an X-axis direction and floating on a water surface, and configured to receive floating objects that have been salvaged. The first shaft 2000 is arranged along a Y-axis direction and rotatably connected to the floating member 1000, the power mechanism 3000 configured to drive the first shaft 2000 to rotate and then drive the plurality of fishing mechanisms 4000 to rotate along with the first shaft 2000, the plurality of fishing mechanisms 4000 configured to collect the floating objects in the water. The guiding member 5000 is configured to guide the fishing claws 4300 of the plurality of fishing mechanisms 4000 to rotate and move directly above of the floating member 1000, and then the floating objects within the fishing claws 4300 are fallen onto the floating member 1000 with a help of gravity thereof, thereby transferring the floating objects. The fishing claws 4300 that detach from the guiding member 5000 rotate under an action of an elastic element 4400 and leaving from directly above of the floating member 1000 to reach an outer side of the floating member 1000, so as to continue to salvage the floating objects; the first mechanism 6000 configured to move the water relative to the floating member 1000, to clean up different water areas.

Figure 4:
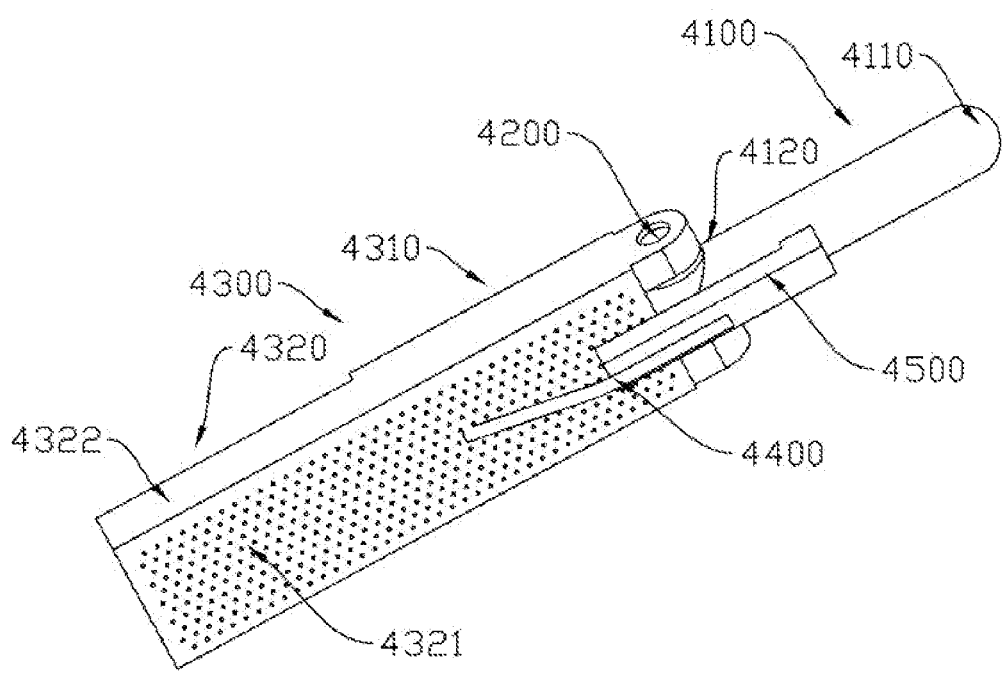
FIG. 4 is a schematic view of a fishing mechanism of the water resource circulation and purification device of FIG. 1.
Figure 5:
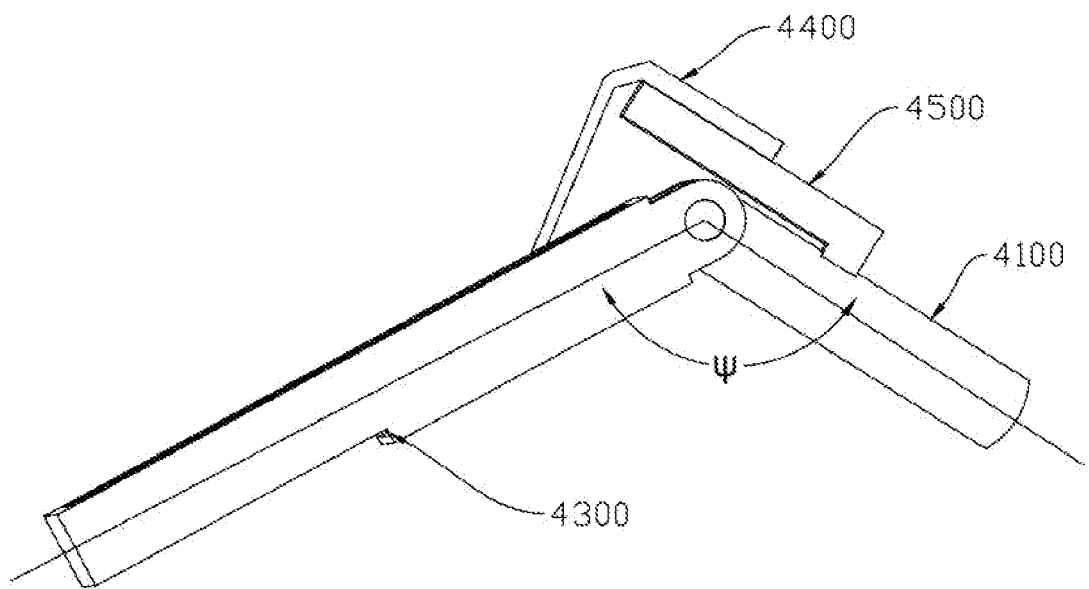
FIG. 5 is a schematic view of a state that a fishing claw of the fishing mechanism shown in FIG. 4 rotates a certain angle around a supporting rod of the present disclosure.

Referring to FIG. 4 and FIG. 5, FIG. 4 is a schematic view of the fishing mechanism 4000 of the present disclosure, and FIG. 5 is a schematic view of a state that the fishing claw 4300 of the fishing mechanism 4000 shown in FIG. 4 rotates a certain angle around a supporting rod 4100 of the present disclosure. Each fishing mechanism 4000 includes the supporting rod 4100, an articulated shaft 4200, the fishing claw 4300, the elastic element 4400 and a limiting member 4500. One end 4110 of the supporting rod 4100 is fixed with the first shaft 2000, and the other end 4120 of the supporting rod 4100 extends radially along the first shaft 2000 and is fixed with the articulated shaft 4200. The fishing claw 4300 includes a box-shaped cabin 4310 and a clawing portion 4320 connected to the cabin 4310; a plurality of sieves is formed on a bottom plate 4321 of the clawing portion 4320, after water and the floating objects enter the clawing portion 4320, water flows out of the sieves, and the floating objects are intercepted in the clawing portion 4320. During the fishing claw 4300 rotating along with the first shaft 2000, when a horizontal height of the clawing portion 4320 is higher than a horizontal height of the cabin 4310, the floating objects in the clawing portion 4320 will slide into the cabin 4310 for being temporary stored; the cabin 4310 is hinged with the supporting rod 4100 through the articulated shaft 4200, to hinge the fishing claw 4300 with the supporting rod 4100. When both the supporting rod 4100 and the fishing claw 4300 rotate around the articulated shaft 4200, an included angle ψ between the supporting rod 4100 and the fishing claw 4300 will be constantly changed, the limiting member 4500 is configured to limit a maximum value of the included angle ψ, that is, a maximum included angle, the elastic element 4400 configured to push the fishing claw 4300 and the supporting rod 4100 to expand the included angle ψ to be the maximum included angle, a state that the included angle ψ between the fishing claw 4300 and the supporting rod 4100 is the maximum included angle, is a reset state.

Referring to FIG. 1 and FIG. 7, when the fishing claw 4300 is in the reset state, the fishing claw 4300 is located on the outer side of the floating member 1000, that is, a projection of the fishing claw 4300 is un-intersected with a projection of the floating member 1000 on an X-Y plane. In this way, the first shaft 2000 can drive the supporting rod 4100 and the fishing claw 4300 to rotate on the outer side of the floating member 1000 to salvage the floating objects. An acute angle is formed between the articulated shaft 4200 and the first shaft 2000, that is, the articulated shaft 4200 and the first shaft 2000 are neither perpendicular nor parallel to each other. As the articulated shaft 4200 is not parallel to the first shaft 2000, after the fishing claw 4300 rotates around the articulated shaft 4200, a distance of the fishing claw 4300 along the Y-axis direction within the X-Y plane will be changed, so that the clawing portion 4320 of the fishing claw 4300 moves from the side above of the floating member 1000 to the right above of the floating member 1000. If the articulated shaft 4200 and the first shaft 2000 are perpendicular to each other, during the rotation process, only a sidewall 4322 of the clawing portion 4320 is taken as an upstream surface, and the floating objects can't enter the clawing portion 4320 along with the flowing water. Therefore, only when the articulated shaft 4200 and the first shaft 2000 aren't perpendicular to each other, water will flow continuously to enter the clawing portion 4320, so that the floating objects in the water can be successfully salvaged.

The guiding member 5000 is fixed above the floating member 1000 and configured to guide the fishing claw 4300 that is arranged above a side of the floating member 1000, to rotate around the articulated shaft 4200 to the right above of the floating member 1000. When the fishing claw 4300 detaches from the guiding member 5000, the horizontal height of the clawing portion 4320 is lower than the horizontal height of the cabin 4310, so that the floating objects within the fishing claw 4300 are fallen onto the floating member 1000 with a help of gravity of the floating objects, so as to completely transfer the floating objects. In addition, the guiding member 5000 is fixed above the floating member 1000 in a suspended manner, in this way, there is a certain space formed between a lower part of the guiding member 5000 and an upper part of the floating member 1000, so that the fishing claw 4300 that detaches from the guiding member 5000 returns to the reset state under an action of the elastic element 4400 within the space, which is located on the outer side of the floating member 1000 to continue to salvage the floating objects.

Figure 6:
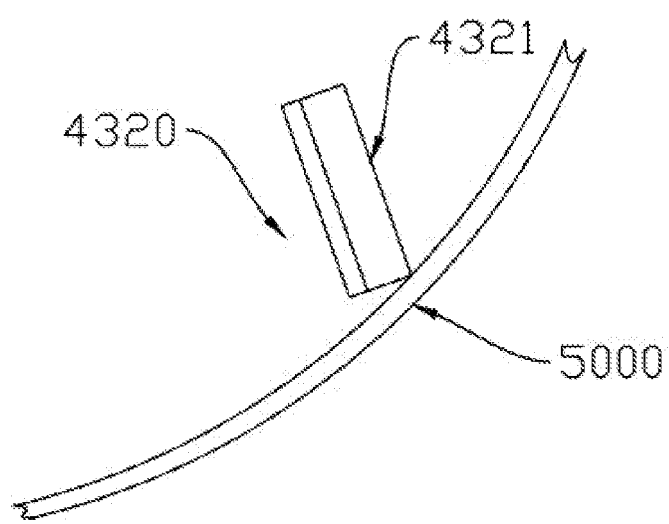
FIG. 6 is a schematic view of a state that the fishing claw sliding along a guiding member of the water resource circulation and purification device of FIG. 1.

In an embodiment of the present disclosure, the guiding member 5000 is a rod-shaped structure and supported above the floating member 1000 by a first straight rod 5001; a shape of the rod can be a straight rod as shown in FIG. 1 or a curved rod as shown in FIG. 7. The guiding member 5000 includes a first portion 5100 and a second portion 5200; a horizontal height of the first portion 5100 greater than a horizontal height of the second portion 5200, the first portion 5100 passing through a space swept by the fishing claw 4300 that is in the reset state along with rotation of the first shaft 2000, and the second portion 5200 arranged directly above of the floating member 1000. Therefore, during the fishing claw 4300 rotating along with the first shaft 2000, the fishing claw 4300 is in contact with the guiding member 5000, and then as shown in FIG. 6, a contact position between the fishing claw 4300 and the guiding member 5000 is located at an edge of the bottom plate 4321; the fishing claw 4300 slides downwards along an outer wall of the guiding member 5000, during the sliding process, the fishing claw 4300 rotates around the articulated shaft 4200 to change its own distance along the Y-axis direction within the X-Y plane, that is, the fishing claw 4300 moves directly above of the floating member 1000, after the fishing claw 4300 has been detached from the guiding member 5000, the fishing claw 4300 returns to the reset state to continue to salvage the floating objects in the water.

In the present disclosure, a carrying member 100 is provided to float on the water, and a buoyancy of the carrying member 100 can be controlled through setting a material and a structure of the carrying member 100 to make the buoyancy of the carrying member 100 greater than a gravity of the carrying member 100. For example, in some embodiments of the present disclosure, the carrying member 100 can be integrally made of low-density (lower than a density of water) dry wood, and in other embodiments of the present disclosure, the carrying member 100 is a boat-shaped structure made of steel.

In the present disclosure, the maximum angle between the supporting rod 4100 and the fishing claw 4300 can affect an upstream area between the fishing claw 4300 and the water after the fishing claw 4300 enters the water. In some embodiments of the present disclosure, the maximum angle is 160°, while, in other embodiments of the present disclosure, the maximum angle is about 180°. In this way, a volume of water passing through the clawing portion 4320 during the clawing portion 4320 rotating a circle around the first shaft 2000 is the largest, which can salvage more floating objects.

Figure 8:
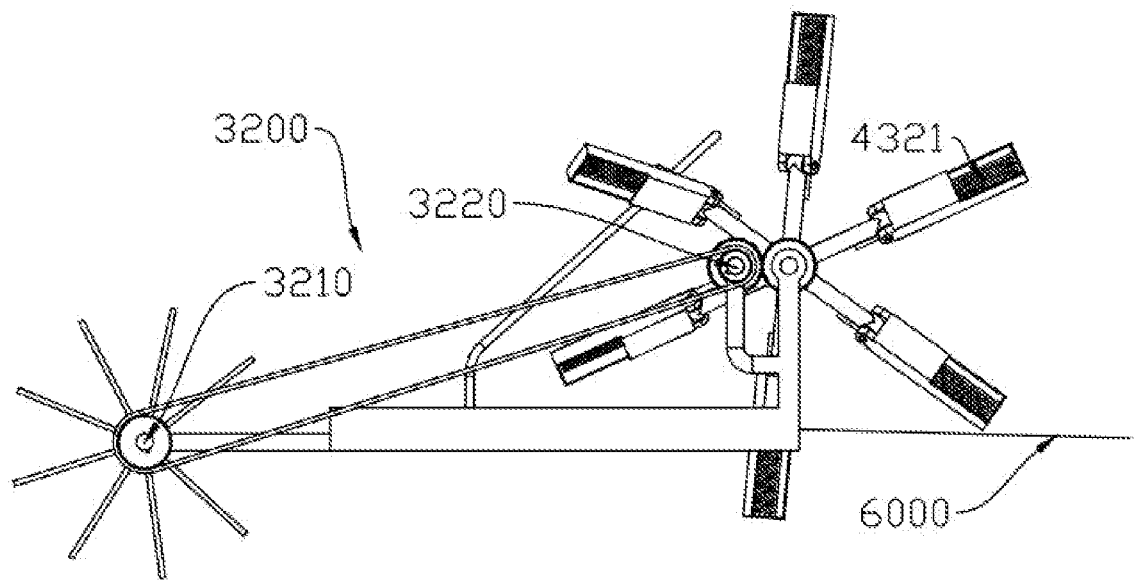
FIG. 8 is a front view of the water resource circulation and purification device of FIG. 7.

In the present disclosure, the power mechanism 3000 can be selected according to actual requirements, such as a motor as shown in FIG. 1. For flowing water, the water flow itself is also as a driving force. A water blade can be set up to use the water flow to drive the water blade to rotate, to further drive the first shaft 2000 to rotate. For example, in some embodiments of the present disclosure, the power mechanism 3000 includes a water blade 3100 and a drive mechanism 3200. The water blade 3100 is configured to use water flow to drive an own rotation of the water blade 3100, and connected to the first shaft 2000 through the drive mechanism 3200, so as to drive the first shaft 2000 to rotate. There are various specific configurations of the drive mechanism 3200, for example, in some embodiments of the present disclosure, referring to FIG. 7 and FIG. 8, the drive mechanism 3200 includes a second shaft 3210 coaxially fixed with the water blade 3100, and a third shaft 3220 rotatably connected to the floating member 1000; the second shaft 3210 and the third shaft 3220 are connected with each other by a chain and sprocket transmission way so that both the second shaft 3210 and the third shaft 3220 rotate in the same direction, and the third shaft 3220 and the first shaft 2000 are connected with each other by a gear meshing way.

In the present disclosure, the first mechanism 6000 is configured to move water relative to the floating member 1000. In still water, a common method is to use a propulsion device to push a boat to move; for example, in some embodiments of the present disclosure, the first mechanism 6000 is an oar as shown in FIG. 1, which is manually moved to push the boat to move. In other embodiments of the present disclosure, the first mechanism 6000 can be a propulsion device that is commonly used for a conventional boat to push the boat to move in the water. In flowing water, the water flows naturally so that it only needs to position the boat in the river. Therefore, in some embodiments of the present disclosure, the first mechanism 6000 is a fixed device configured to position the floating member 1000 in the river. Specifically, a Y-shaped rope or a steel chain can be used, so that one end of the Y-shaped rope or the steel chain is connected to the floating member 1000, and the other end of the Y-shaped rope or the steel chain is fixed with piles on both banks of the river; of course, an anchoring device can also be set up to anchor the boat in the river, such as setting anchors and anchor chains.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. A water resource circulation and purification device comprising
    a floating member arranged along an X-axis direction and floating on a water surface, and configured to receive floating objects that have been salvaged;
    a first mechanism configured to cause the floating member to move relative to the water;
    a first shaft arranged along a Y-axis direction and rotatably connected to the floating member;

a power mechanism configured to drive the first shaft to rotate; and at least one fishing mechanism comprising:

a supporting rod radially arranged along the first shaft and one end of the supporting rod fixed with the first shaft; a projection of the supporting rod non-intersected with a projection of the floating member on an X-Y plane;

an articulated shaft arranged on the other end of the supporting rod, with an acute angle being formed between the articulated shaft and the first shaft;

a fishing claw comprising an uncovered cabin hinged with the supporting rod through the articulated shaft, and a clawing portion configured to collect the floating objects and filter water of the floating objects that have been collected;

a limiting member configured to limit a maximum angle between the supporting rod and the fishing claw;

an elastic element configured to move the fishing claw along a direction of expanding an angle between the fishing claw and the supporting rod; and wherein the fishing claw is in a reset state when the angle between the fishing claw and the supporting rod is the maximum angle; when the fishing claw is in the reset state, a projection of the fishing claw is un-intersected with the projection of the floating member on the X-Y plane; and a guiding member fixed above the floating member and configured to guide the fishing claw that is arranged above a side of the floating member, to rotate around the articulated shaft to the right above of the floating member; and wherein when the fishing claw detaches from the guiding member, a horizontal height of the clawing portion is lower than a horizontal height of the cabin, so that the floating objects within the fishing claw fall onto the floating member with a help of gravity of the floating objects; and after the fishing claw detaches from the guiding member, the fishing claw returns to the reset state under an action of the elastic element.

2. The water resource circulation and purification device as claimed in claim 1, wherein the guiding member is a rod-shaped structure and comprises a first portion and a second portion, a horizontal height of the first portion greater than a horizontal height of the second portion, the first portion passing through a space swept by the fishing claw that is in the reset state along with rotation of the first shaft, and the second portion arranged directly above of the floating member.

3. The water resource circulation and purification device as claimed in claim 1, wherein the power mechanism is a rotation device.

4. The water resource circulation and purification device as claimed in claim 1, wherein the power mechanism comprises a water blade configured to use water flow to drive an own rotation of the water blade, and a drive mechanism; the water blade connected to the first shaft through the drive mechanism, so as to drive the first shaft to rotate.

5. The water resource circulation and purification device as claimed in claim 4, wherein the drive mechanism comprises a second shaft coaxially fixed with the water blade, and a third shaft rotatably connected to the floating member; the second shaft and the third shaft connected with each other by a chain and sprocket transmission way, and the third shaft and the first shaft connected with each other by a gear meshing way.

6. The water resource circulation and purification device as claimed in claim 1, wherein the maximum angle is 180°.

7. The water resource circulation and purification device as claimed in claim 1, wherein the first mechanism is a propulsion device capable of driving the floating member to move in the water flow.

8. The water resource circulation and purification device as claimed in claim 1, wherein the first mechanism is a fixed device capable of positioning the floating member in a river.

* * * * *